US005649239A

United States Patent [19]
Tamekuni

[11] Patent Number: 5,649,239
[45] Date of Patent: Jul. 15, 1997

[54] CAMERA CONTROLLING FOCUS ACCORDING TO PANNING

[75] Inventor: Yasuhiro Tamekuni, Kanagawa-ken, Japan

[73] Assignee: Canon Kabushiki Kaisha, Tokyo, Japan

[21] Appl. No.: 262,985

[22] Filed: Jun. 21, 1994

[30] Foreign Application Priority Data

Jun. 30, 1993 [JP] Japan .................................. 5-161215

[51] Int. Cl.⁶ .................................................. G03B 13/00
[52] U.S. Cl. ............................................................ 396/104
[58] Field of Search .................................. 354/400–409; 348/208; 396/104

[56] References Cited

U.S. PATENT DOCUMENTS

| 4,545,665 | 10/1985 | Aihara | 354/402 |
| 5,218,444 | 6/1993 | Mizutani et al. | 354/404 |
| 5,335,032 | 8/1994 | Onuki et al. | 354/400 |

*Primary Examiner*—David M. Gray
*Attorney, Agent, or Firm*—Fitzpatrick, Cella, Harper & Scinto

[57] ABSTRACT

A camera includes a focus adjusting circuit for performing focus adjustment of an objective lens, a panning detecting circuit, and a controlling circuit for controlling, on the basis of a detection signal provided by the panning detecting circuit, the focus adjustment of the objective lens which is performed by the focus adjusting circuit, so that a focus adjusting operation can be restrained from being repetitively performed during panning.

7 Claims, 8 Drawing Sheets

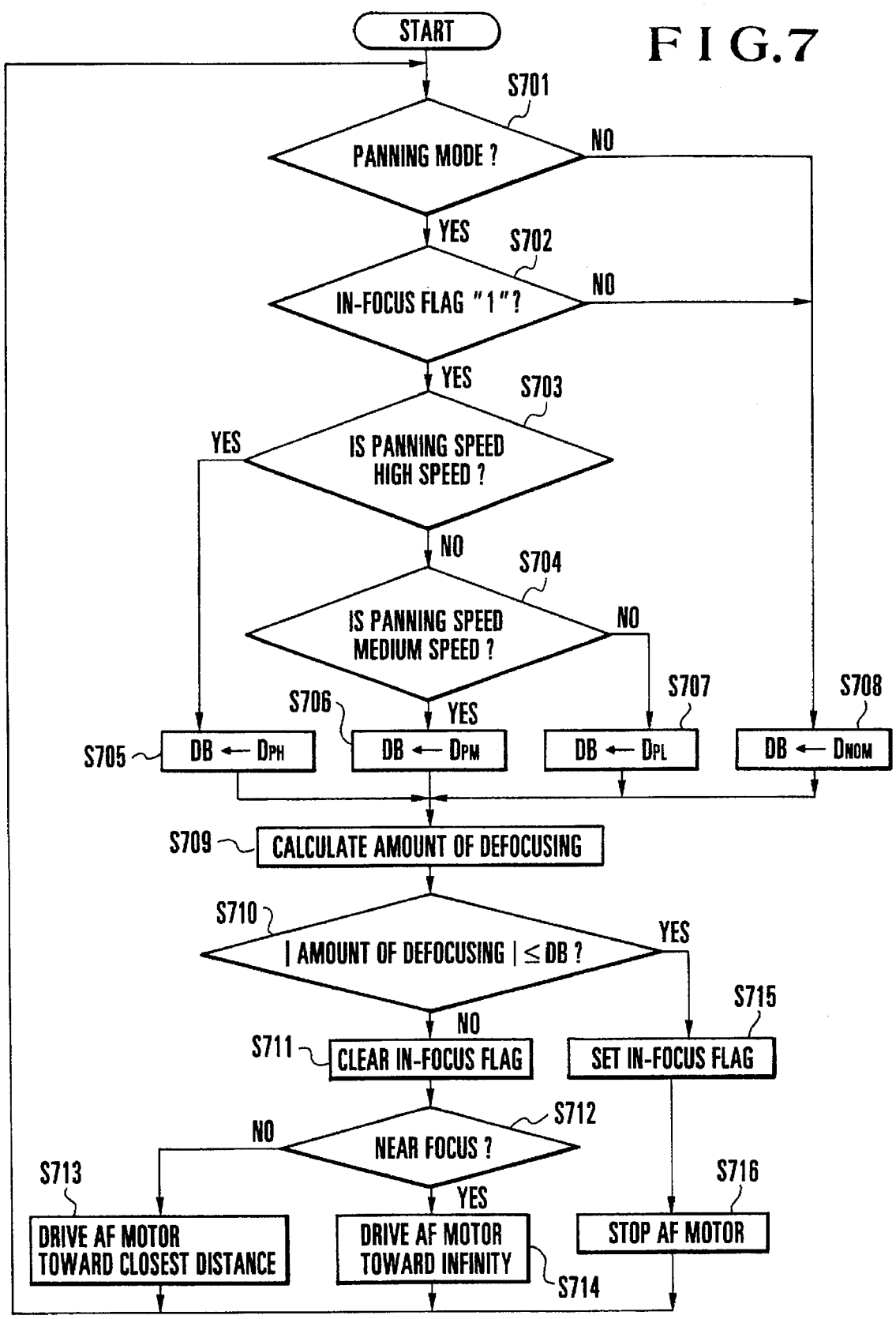

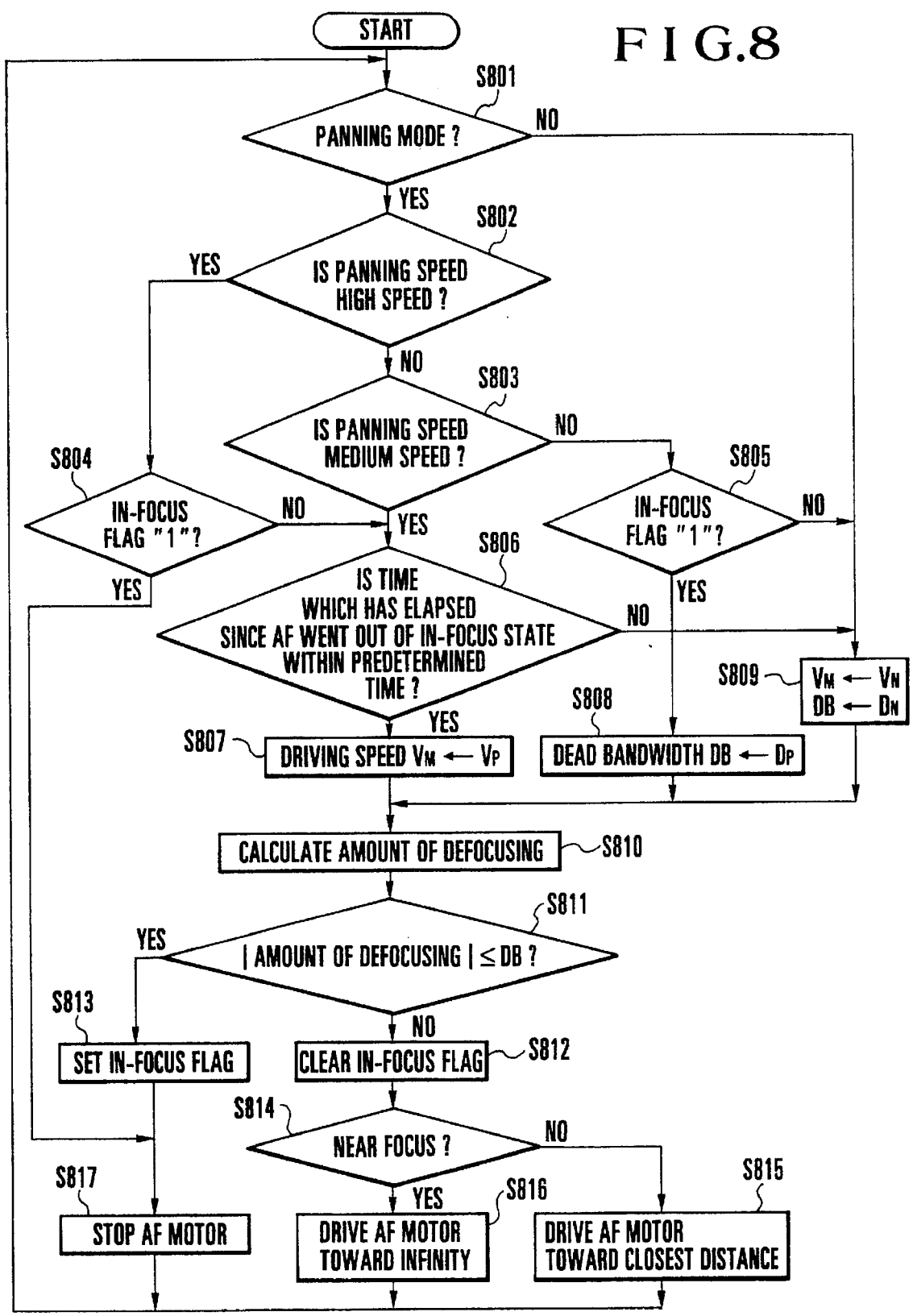

CAMERA CONTROLLING FOCUS ACCORDING TO PANNING

BACKGROUND OF THE INVENTION

1. Field of the Invention

The present invention relates to an image pickup apparatus, such as a video camera, having an automatic focus adjusting function and, more particularly, to an image pickup apparatus capable of effectively preventing occurrence of defocusing during panning by utilizing an image shake detecting mechanism of an image shake correcting function.

1. Description of the Related Art

In the field of image pickup apparatus such as video cameras, an image pickup apparatus has recently been provided which has an automatic focus adjusting function and an image shake correcting function for eliminating the influence of vibration of the image pickup apparatus and providing an image free of a shake. Even ordinary people have become able to photograph high-quality images owing to such an image pickup apparatus.

However, during panning photography, even in the case of the image pickup apparatus having such an image shake correcting function, since the distance to a main subject varies with panning, a focus adjusting operation is frequently performed. As a result, defocusing may occur and a visually impaired image may be produced.

SUMMARY OF THE INVENTION

It is, therefore, an object of the present invention to provide an image pickup apparatus capable of solving the above-described problems and suppressing occurrence of defocus even during panning.

To achieve the above object, in accordance with one aspect of the present invention, there is provided an image pickup apparatus which includes focus adjusting means for performing focus adjustment of an objective lens, panning detecting means, and controlling means for controlling the focus adjustment of the objective lens which is performed by the focus adjusting means, on the basis of a detection signal provided by the panning detecting means.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 7 is a flowchart showing the operation of the third embodiment; and

FIG. 8 is a flowchart showing the operation of the fifth embodiment.

DETAILED DESCRIPTION OF THE PREFERRED EMBODIMENTS

Preferred embodiments of the present invention will be described below with reference to the accompanying drawings.

Figure 1:
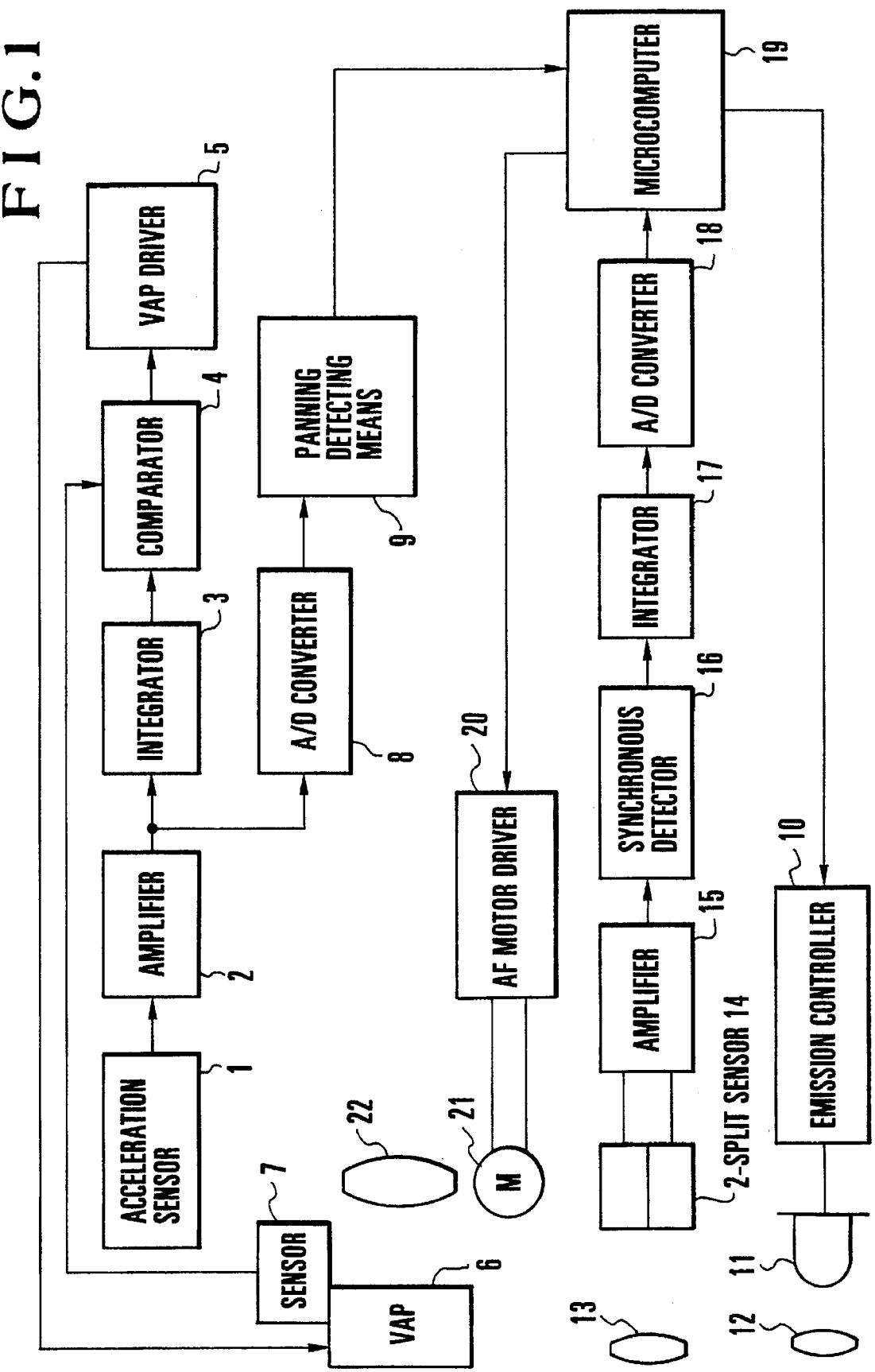
FIG. 1 is a block diagram schematically showing an image pickup apparatus according to a first embodiment of the present invention.

FIG. 1 is a block diagram schematically showing the arrangement of an image pickup apparatus according to a first embodiment of the present invention.

In the arrangement shown in FIG. 1, an angular velocity signal indicative of the vibration of the image pickup apparatus that has been detected by an acceleration sensor 1 is amplified by an amplifier 2, and the amplified angular velocity signal is converted into an angular displacement signal by an integrator 3. A sensor 7 detects a shake angle by which a known variable angle prism (hereinafter referred to as "VAP") 6 is driven, and the angular displacement signal and the output signal of the sensor 7 are sent to a comparator 4. The comparator 4 finds a difference signal between the angular displacement signal and the output signal of the sensor 7. On the basis of the difference signal, a VAP driver 5 drives the VAP 6 to perform an image shake correcting operation.

In the meantime, the angular acceleration signal amplified by the amplifier 2 is converted into a digital signal by an A/D converter 8, and the digital signal is inputted into panning detecting means 9.

An automatic focus adjusting (hereinafter referred to as "AF") operation is performed in the following manner. Infrared light emitted from an infrared light emitting diode 11 driven by an emission controller 10 controlled by a microcomputer 19 passes through a light projecting lens 12 and is reflected by a subject toward a light receiving lens 13. The reflected light passes through the light receiving lens 13 and is made incident on two light receiving parts of a 2-split sensor 14. The 2-split sensor 14 outputs electrical signals corresponding to the amounts of the infrared light incident on the respective light receiving parts of the 2-split sensor 14, and each of the electrical signals is amplified by an amplifier 15 and is then subjected to synchronous detection in a synchronous detector 16. The signal obtained through the synchronous detection is integrated by an integrator 17, and the output signal of the integrator 17 is converted into a digital signal by an A/D converter 18. The digital signal is inputted into the microcomputer 19. On the basis of the thus-obtained input digital signals indicative of the integrated levels of the respective signals from the 2-split sensor 14, the microcomputer 19 determines which is the state of focus of a photographic lens 22, in focus, near focus or far focus, and sends a corresponding control signal to an AF motor driver 20. The microcomputer 19 controls an AF motor 21 to cause it to drive the photographic lens 22, thereby performing an automatic focus adjusting operation. Although the first embodiment is applied to an active type of distance measuring system which is one kind of focus adjusting system for an objective lens, it is a matter of course that the first embodiment can also be applied to, for example, a so-called passive type of distance measuring system which detects the contrast of a subject and performs a focus adjusting operation.

Figure 2:
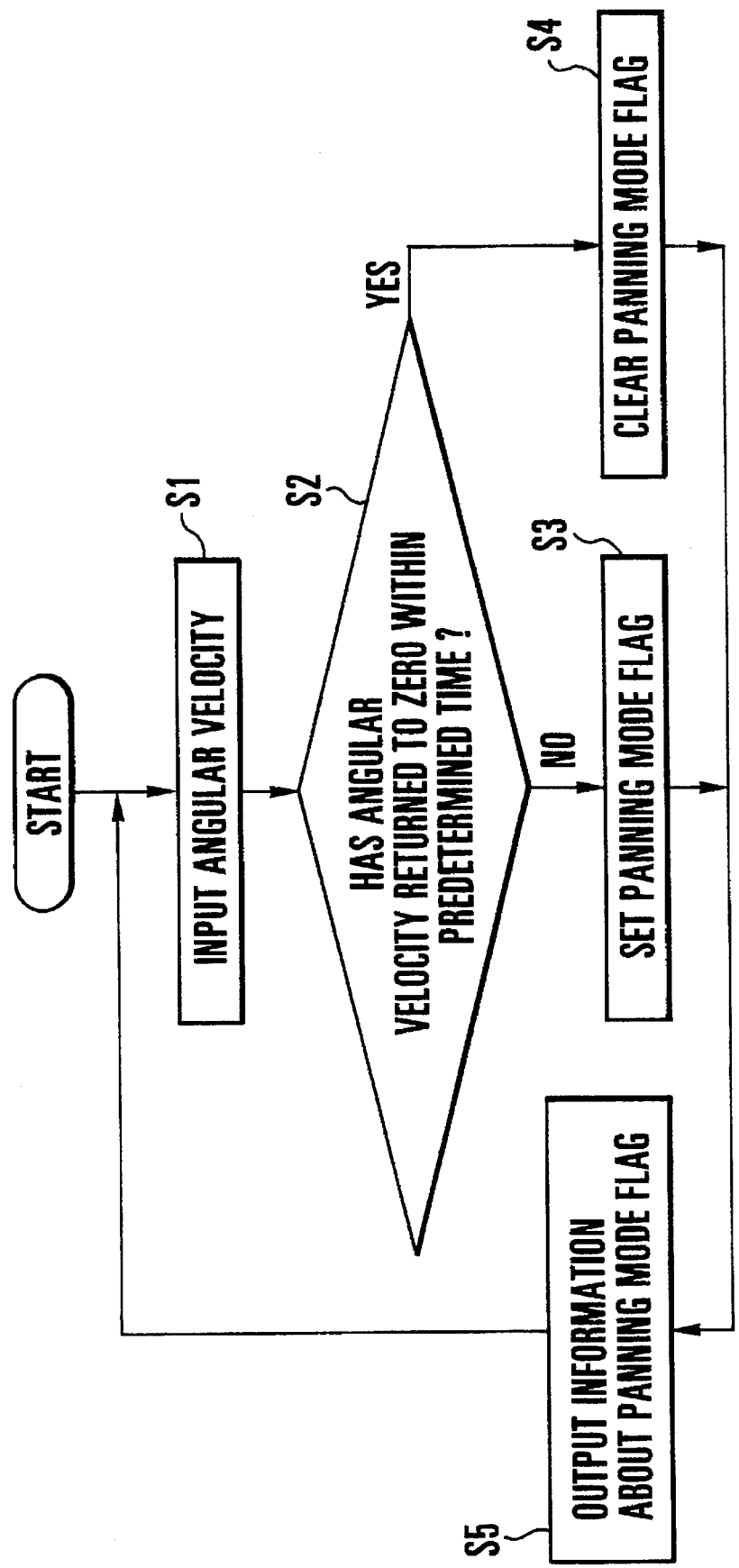
FIG. 2 is a flowchart showing the operation of the panning detecting means shown in FIG. 1.

The panning detecting means 9 is formed by a microcomputer which operates according to the program shown in FIG. 2 by way of example. Referring to FIG. 2, an angular velocity is inputted into the panning detecting means 9 in Step S1, and it is determined in Step S2 whether the angular velocity has returned to zero (or a reference potential) within a predetermined time. If the angular velocity has not returned to zero within the predetermined time, it is determined that a photographer is performing panning, and the process proceeds to Step S3, in which a panning mode flag is set. If the angular velocity signal has returned to zero within the predetermined time, the process proceeds to Step S4, in which the panning mode flag is cleared. In Step S5, information about the panning mode flag is sent to the microcomputer 19 through, for example, an output port.

Figure 4:
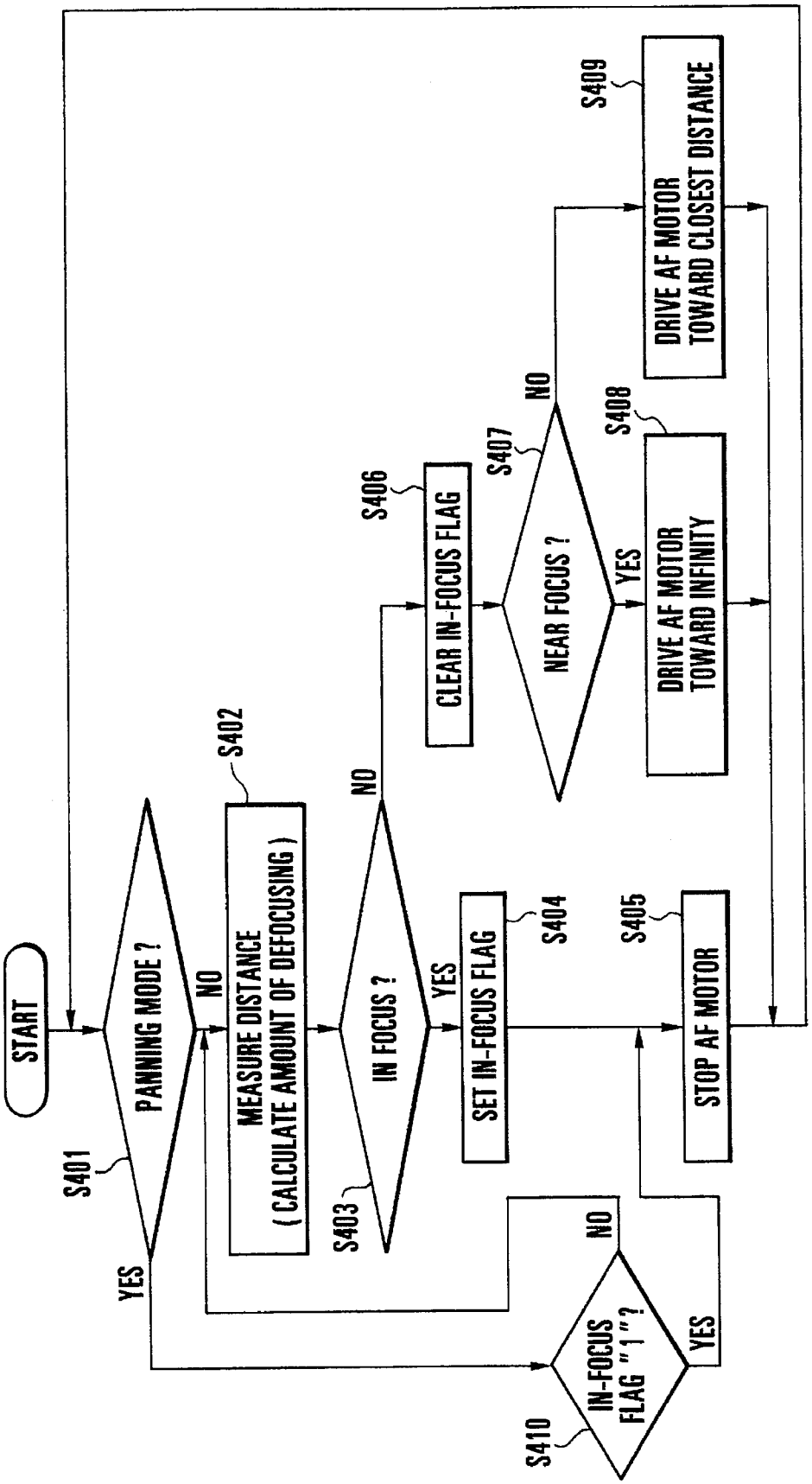
FIG. 4 is a flowchart showing the operation of the microcomputer shown in FIG. 1.

The microcomputer 19 operate according to the program shown in FIG. 4 by way of example. Referring to FIG. 4, in Step S401, the information about the panning mode flag is inputted into the microcomputer 19 from the panning detecting means 9 and it is determined whether a panning mode is active. If the panning mode is not active, the process proceeds to Step S402, in which the amount of defocusing is calculated through distance measurement.

The amount of defocusing is represented as |A−B|, where A and B represent the values of the integrated levels of signals corresponding to the amounts of light incident on the respective light receiving parts of the 2-split sensor 14, the integrated levels being inputted into the microcomputer 19. Then, in Step S403, it is determined whether the amount of defocusing obtained in Step S403 is not greater than a predetermined value. If the amount of defocusing is not greater than the predetermined value, it is determined that the photographic lens 22 is in focus, and the process proceeds to Step S404, in which an in-focus flag is set. In Step S405, the AF motor 21 is made to stop. If it is determined in Step S403 that the amount of focusing is greater than the predetermined value, the process proceeds to Step S406, in which the in-focus flag is cleared, and it is determined in Step S407 whether the photographic lens 22 is in near focus. Whether the photographic lens 22 is in near focus is determined on the basis of, for example, the sign of "A−B". If it is determined in Step S407 that the photographic lens 22 is in near focus, the process proceeds to Step 8408, in which the AF motor 21 is driven to move in the direction of its infinity end. If it is determined in Step S407 that the photographic lens 22 is not in near focus, the process proceeds to Step S409, in which the AF motor 21 is driven to move in the direction of its closest-distance end.

If it is determined in Step S401 that the panning mode is active, the process proceeds to Step S410, in which it is determined whether the in-focus flag has been set. If the in-focus flag has been set, the process proceeds to Step S405, in which the AF motor 21 is kept in a stopped state. If it is determined in Step S410 that the in-focus flag has not been set, the process proceeds to Step S402, in which the processing of the above-described focus adjusting operation is performed.

According to the first embodiment, if an objective lens is in focus at the time of the start of panning, defocus signals produced during the panning are ignored so that defocusing which unnecessarily occurs during the panning is prevented, i.e., the focus adjusting operation of a focus adjusting system is inhibited. Further, even if the objective lens is not in focus at the time of the start of panning, an AF motor is made to stop at a time when the objective lens comes into focus, and the stopped state of the AF motor is maintained until the panning is ended. Accordingly, it is possible to suppress the occurrence of unnecessary defocusing during the panning.

Incidentally, the panning detecting means 9 may also be provided in the microcomputer 19.

Figure 5:
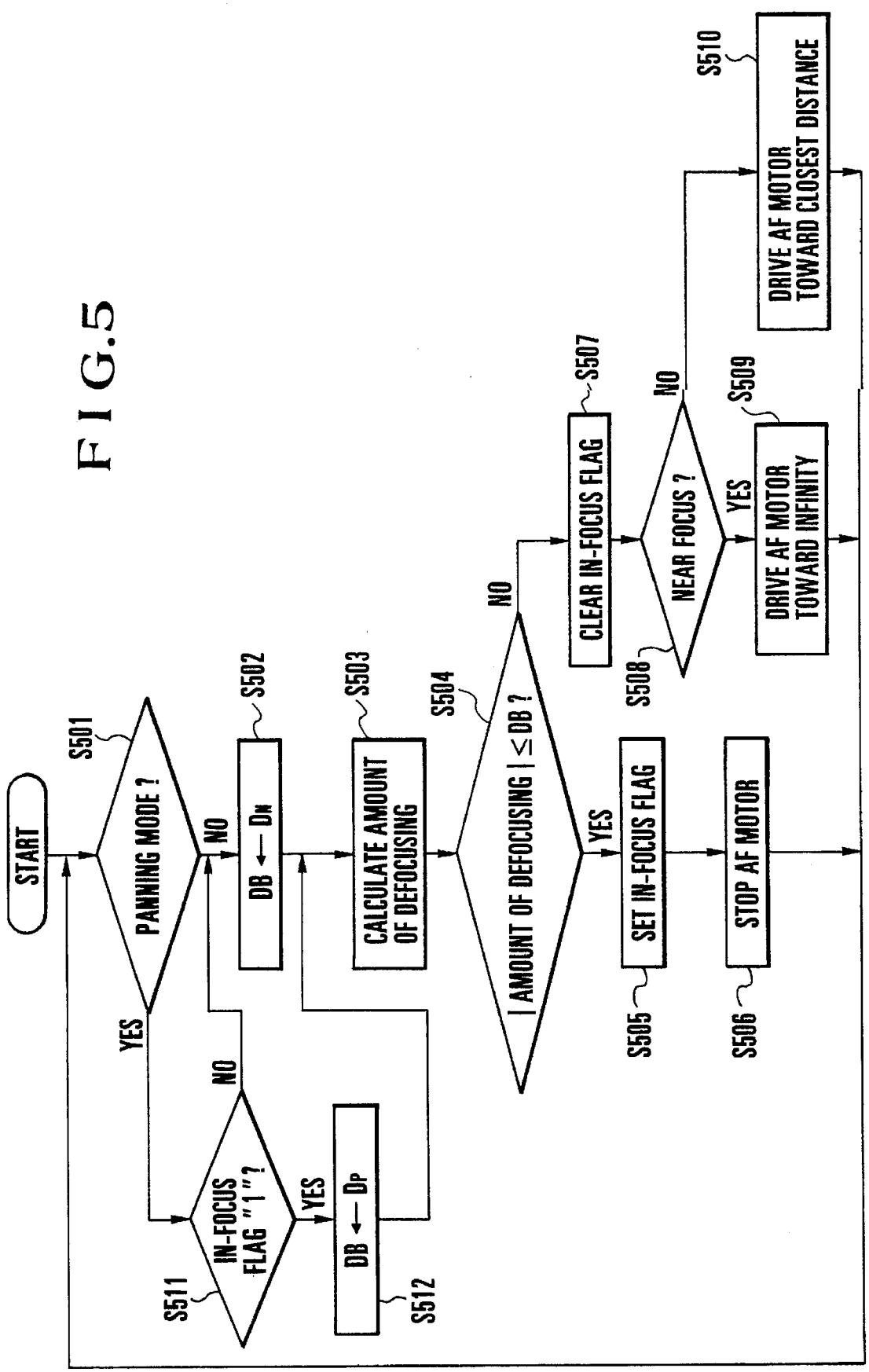
FIG. 5 is a flowchart showing the operation of a second embodiment.

FIG. 5 shows the operation of a second embodiment, and is a flowchart of a program incorporated in the microcomputer 19 of FIG. 1. The panning detecting means 9 operates according to the program shown in the above-described flowchart of FIG. 2.

Referring to FIG. 5, in Step S501, information from the panning detecting means 9 is inputted into the microcomputer 19 and it is determined whether the panning mode is active. If the panning mode is not active, the process proceeds to Step S502, in which a first predetermined value $D_N$ is set as a width (dead bandwidth) DB for determining whether the photographic lens 22 is in focus. Then, in Step S503, the amount of defocusing is calculated, and it is determined in Step S504 whether the amount of defocusing is not greater than the predetermined value DB. If the amount of defocusing is not greater than the predetermine value DB, it is determined that the photographic lens 22 is in focus, and the in-focus flag is set in Step S505 and the AF motor 21 is made to stop in Step S506. If it is determined in Step S504 that the amount of defocusing is greater than the predetermined value DB, it is determined that the photographic lens 22 is out of focus, and the process proceeds to Step S507. In Step S507, the in-focus flag is cleared, and it is determined in Step S508 whether the photographic lens 22 is in near focus. If it is determined in Step S508 that the photographic lens 22 is in near focus, the process proceeds to Step S509, in which the AF motor 21 is driven to move in the direction of the infinity end. If it is not determined in Step S508 that the photographic lens 22 is in near focus, the process proceeds to Step S510, in which the AF motor 21 is driven to move in the direction of the closest-distance end, thereby performing a focusing adjusting operation.

If it is determined in Step S501 that the panning mode is active, the process proceeds to Step S511, in which it is determined whether the in-focus flag has been set. If the in-focus flag has been set (the value of the in-focus flag=1), the process proceeds to Step S512, in which a second predetermined value $D_P$ is set as the dead bandwidth DB. If it is determined in Step S511 that the in-focus flag has not been set, the process proceeds to Step S502, in which the first predetermined value $D_N$ is set as the dead bandwidth DB. The values $D_P$ and $D_N$ are determined to satisfy $D_P > D_N$.

According to the second embodiment, if an objective lens comes into focus at the time of the start of panning or during the panning, then the dead bandwidth for determining whether the objective lens is in focus is made wider so that the objective lens can subsequently be prevented from easily going out of the in-focus state. Accordingly, it is possible to suppress the occurrence of unnecessary defocusing during the panning.

FIG. 7 shows the operation of a third embodiment, and is a flowchart of a program incorporated in the microcomputer 19 of FIG. 1. The panning detecting means 9 operates according to the program shown in the flowchart of FIG. 3.

Figure 3:
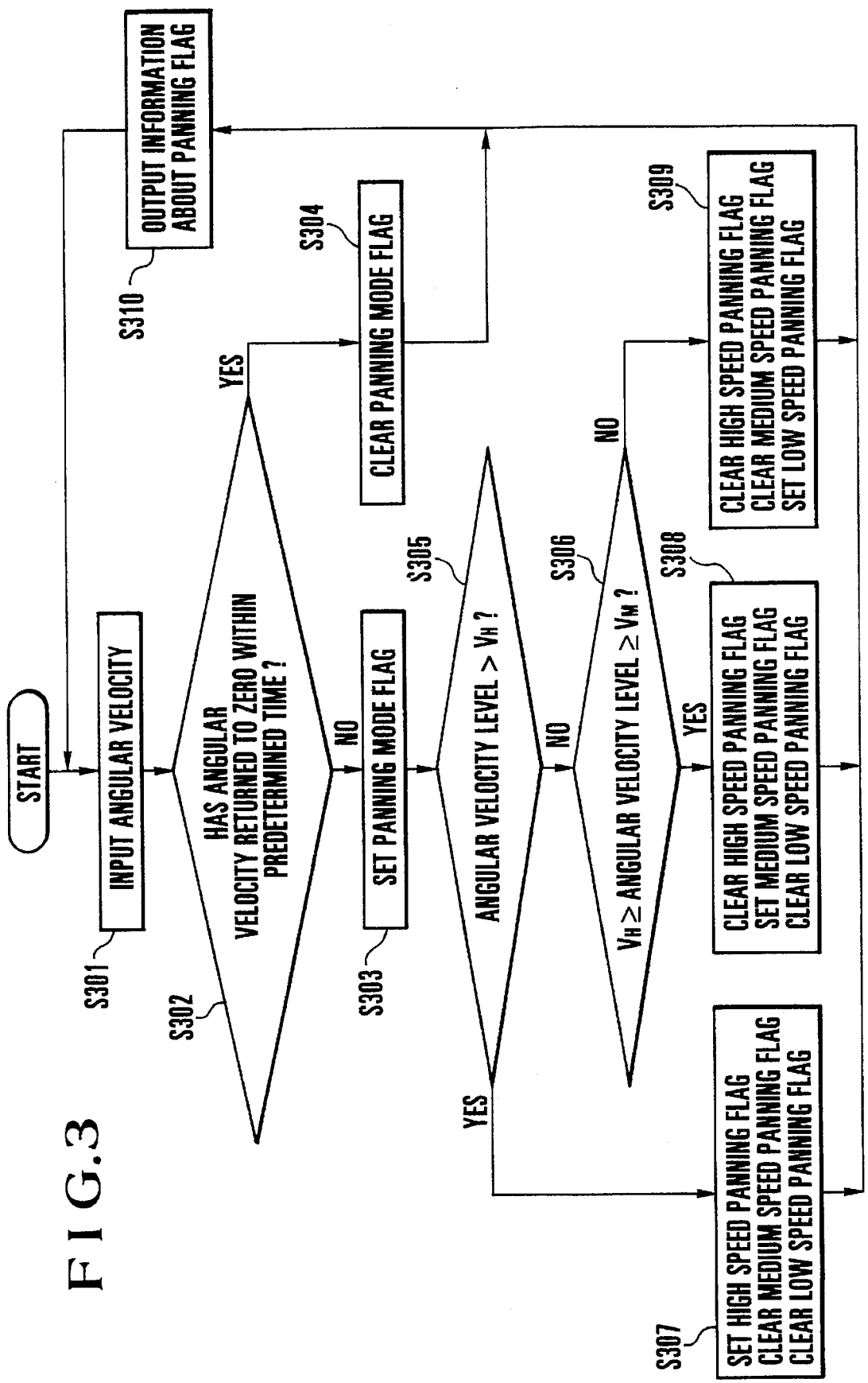
FIG. 3 is a flowchart showing the operation of panning detecting means which is used in each of third, fourth and fifth embodiments.

Referring to FIG. 3, in Step S301, an angular velocity level is inputted into the panning detecting means 9, and it is determined in Step S302 whether the angular velocity has returned to zero (or a reference potential) within a predetermined time. If the angular velocity has not returned to zero within the predetermined time, it is determined that panning is being performed, and the panning mode flag is set in Step S303. If it is determined in Step S302 that the angular velocity has returned to zero within the predetermined time, it is determined that no panning is being performed, and the panning mode flag is cleared in Step S304. After the panning mode flag is set in Step S303, it is determined in Step S305 whether the angular velocity level is greater than a first predetermined value $V_H$. If the angular velocity level is greater than the first predetermined value $V_H$, the process proceeds to Step S307, in which a high speed panning flag indicative of the speed of the panning is set and a medium speed panning flag and a low speed panning flag are cleared. If it is determined in Step S305 that the angular velocity level is not greater than the first predetermined value $V_H$, it is determined in Step S306 whether the angular velocity level is not greater than the first predetermined value $V_H$ and not less than a second predetermined value $V_M$. If this condition is satisfied, the process proceeds to Step S308, in which the medium speed panning flag is set and the high speed panning flag and the low speed panning flag are cleared. If the condition is not satisfied, the process proceeds to Step S309, in which the low speed panning flag is set and the high speed panning flag and the medium speed panning flag are cleared. The status of each of the high speed panning flag, the medium speed panning flag and the low speed panning flag is sent to the microcomputer 19 through an output port in Step S310.

The microcomputer 19 operates according to the program shown in the flowchart of FIG. 7. Referring to FIG. 7, in Step S701, information from the panning detecting means 9 is inputted into the microcomputer 19 and it is determined whether the panning mode is active. If the panning mode is not active, a predetermined value $D_{NOM}$ is set as the dead bandwidth DB in Step S708. If the panning mode is active, it is determined in Step S702 whether the in-focus flag has been set. If the in-focus flag has not been set, the process proceeds to Step S708, whereas if it has been set, the process proceeds to Step S703.

If it is determined in Step S703 that the panning speed is a high speed, a predetermined value $D_{PH}$ is set as the dead bandwidth DB in Step S705. If it is determined in Step S704 that the panning speed is a medium speed, the process proceeds to Step S706, in which a predetermined value $D_{PM}$ is set as the dead bandwidth DB. If the panning speed is neither the high speed nor the medium speed, the process proceeds to Step S707, in which a predetermined value $D_{PL}$ is set as the dead bandwidth DB. After any of these values is set as the dead bandwidth DB, the amount of defocusing is calculated in Step S709, and it is determined in Step S710 whether the amount of defocusing is not greater than the dead bandwidth DB. If the amount of defocusing is equal to or smaller than the dead bandwidth DB, it is determined that the photographic lens 22 is in focus, and the process proceeds to Step S715, in which the in-focus flag is set, and the AF motor 21 is made to stop in Step S716. If it is determined in Step S710 that the amount of defocusing is greater than the dead bandwidth DB, it is determined that the photographic lens 22 is out of focus, the process proceeds to Step S711, in which the in-focus flag is cleared. In Step S712, it is determined whether the photographic lens 22 is in near focus. If the photographic lens 22 is in near focus, the process proceeds to Step S714, in which the AF motor 21 is driven to move in the direction of the infinity end. If the photographic lens 22 is not in near focus, the process proceeds to Step S713, in which the AF motor 21 is driven to move in the direction of the closest-distance end.

According to the third embodiment, the dead bandwidth is made wide so that it can be determined whether the photographic lens 22 is in focus when in it is in the in-focus state during panning, and the extent to which the dead bandwidth is made wide can be varied according to the panning speed.

According to the third embodiment, the predetermined values $D_{PH}$, $D_{PM}$, $D_{PL}$ and $D_{NOM}$ are set to satisfy $D_{PH} > D_{PM} > D_{PL} >$ and $D_{NOM}$. Therefore, during high-speed panning, the photographic lens 22 is prevented from easily going out of its in-focus state, whereby the occurrence of unnecessary defocusing can be suppressed. During low-speed panning, the photographic lens 22 is allowed to go out of the in-focus state more easily than during the high-speed panning, whereby the tracking performance of a focus adjusting function during the low-speed panning can be made close to the tracking performance which can be achieved by the focus adjusting function when the panning mode is not active.

Figure 6:
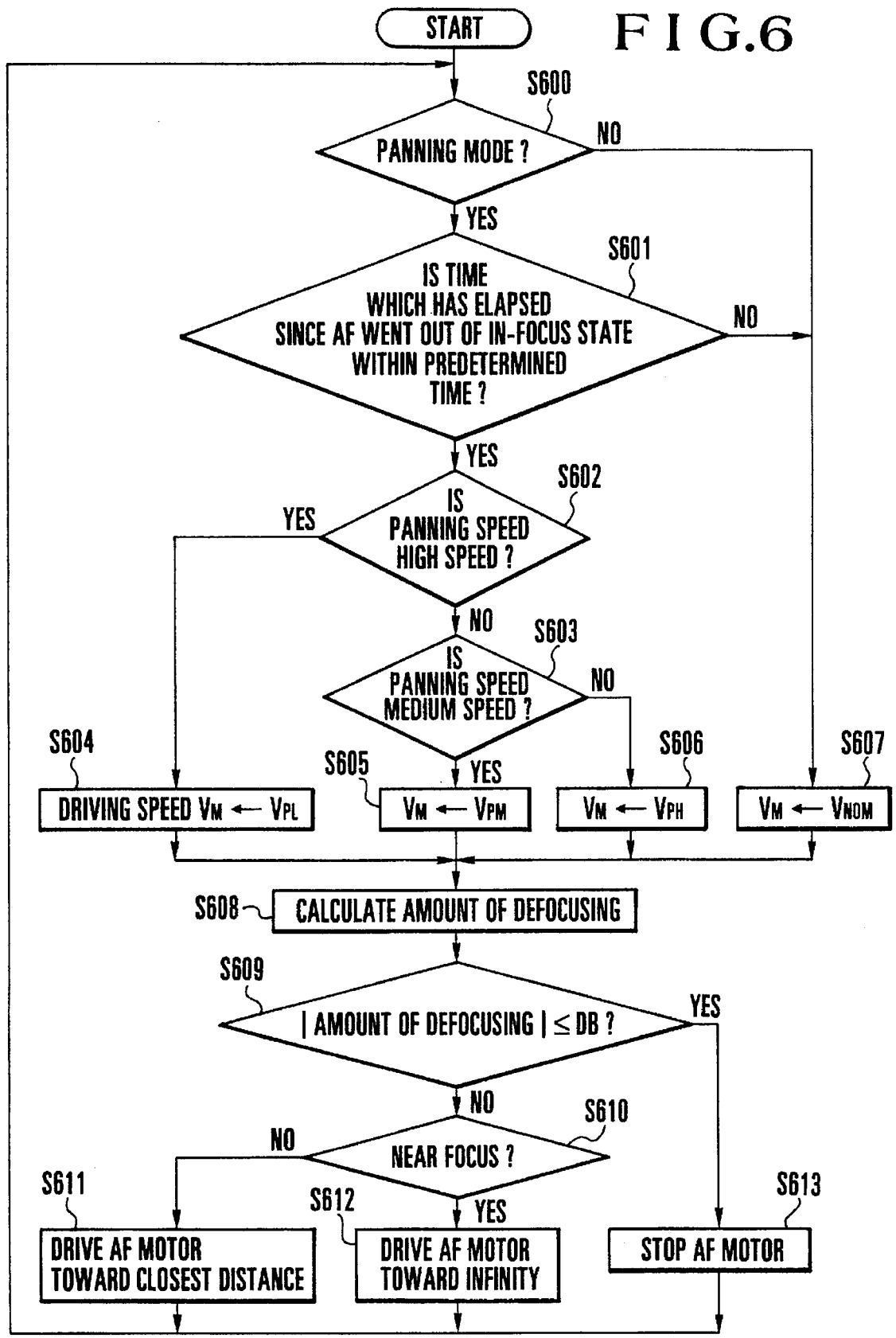
FIG. 6 is a flowchart showing the operation of the fourth embodiment.

FIG. 6 shows the operation of a fourth embodiment, and is a flowchart of a program incorporated in the microcomputer 19 of FIG. 6. The panning detecting means 9 operates according to the program shown in the above-described flowchart of FIG. 3.

Referring to FIG. 6, in Step S600, information from the panning detecting means 9 is inputted into the microcomputer 19, and if the panning mode is not active, the process proceeds to Step S607, in which a predetermined value $V_{NOM}$ is set in a register $V_M$ for determining the speed at which to drive the AF motor 21. If it is determined in Step S600 that the panning mode is active, the process proceeds to Step S601, in which it is determined whether the elapsed time after the photographic lens 22 has shifted from an in-focus state to a defocused state is within a predetermined time. If the elapsed time is not within the predetermined time, the process proceeds to Step S607. If the elapsed time is within the predetermined time, it is determined in Step S602 whether the panning speed is a high speed. If the panning speed is a high speed, the process proceeds to Step S604, in which a predetermined value $V_{PL}$ is set in the register $V_M$ for determining an AF motor driving speed. If it is determined in Step S602 that the panning speed is not a high speed, the process proceeds to Step S603, in which it is determined whether the panning speed is a medium speed. If the panning speed is a medium speed, a predetermined value $V_{PM}$ is set in the register $V_M$ in Step S605. If it is determined in Step S603 that the panning speed is not a medium speed, a predetermined value $V_{PH}$ is set in the register $V_M$ in Step S606. The predetermined values $V_{NOM}$, $V_{PL}$, $V_{PM}$ and $V_{PH}$ are set to satisfy $V_{NOM} > V_{PH} > V_{PM} > V_{PL}$.

Then, in Step S608, the amount of defocusing is calculated, and it is determined in Step S609 whether the amount of defocusing is equal to or smaller than the dead bandwidth DB. If the amount of defocusing is equal to or smaller than the dead bandwidth DB, it is determined that the photographic lens 22 is in focus, and the process proceeds to Step S613, in which the AF motor 21 is made to stop. If it is determined in Step S609 that the amount of defocusing is greater than the dead bandwidth DB, it is determined that the photographic lens 22 is out of focus. In Step S610, it is determined whether the photographic lens 22 is in near focus. If the photographic lens 22 is in near focus, the process proceeds to Step S612, in which the AF motor 21 is driven to move in the direction of the infinity end. If the photographic lens 22 is not in near focus, the process proceeds to Step S611, in which the AF motor 21 is driven to move in the direction of the closest-distance end. In each of Steps S611 and S612, the speed at which the AF motor 21 is driven is a speed corresponding to the value set in the register $V_M$ for determining the AF motor driving speed.

According to the fourth embodiment, during the panning mode, if it is determined that the objective lens has shifted from an in-focus state to a defocused state and the driving of the AF motor needs to be restarted, the driving speed of the AF motor is made lower than that selected when the panning mode is not active, for a predetermined time during a restarting operation, so that the occurrence of unnecessary defocusing during the panning can be suppressed. According to the fourth embodiment, by making the driving speed of the AF motor slower as the panning speed becomes faster, it is possible to maintain the tracking performance of AF during low-speed panning and it is also possible to suppress the occurrence of defocusing during high-speed panning.

FIG. 8 shows the operation of a fifth embodiment, and is a flowchart of a program incorporated in the microcomputer 19. The panning detecting means 9 operates according to the program shown in FIG. 3.

Referring to FIG. 8, panning information is inputted into the microcomputer 19 in Step S801, and if the panning mode is not active, the process proceeds to Step S809, in which a predetermined value $V_N$ is set in the register $V_M$ for determining the AF motor driving speed and a predetermined value $D_N$ is set as the dead bandwidth DB for determining whether the photographic lens 22 is in focus. If it is determined in Step S801 that the panning mode is active, it is determined in Step S802 whether the panning speed is a high speed. If the panning speed is a high speed, the process proceeds to Step S804, in which it is determined whether the in-focus flag indicating whether the photographic lens 22 is in focus has been set. If the in-focus flag is on, the AF motor 21 is made to stop in Step S817. If the in-focus flag is off, the process proceeds to Step S806. If it is determined in Step S802 that the panning speed is not a high speed, it is determined in Step S803 whether the panning speed is a medium speed. If the panning speed is a medium speed, it is determined in Step S806 whether the elapsed time after the photographic lens 22 has gone out of an in-focus state is within a predetermined time. If the elapsed time is within the predetermined time, the process proceeds to Step S807, in which a predetermined value $V_P$ is set in the register $V_M$ for determining the AF motor driving speed. If the elapsed time is not within the predetermined time, the process proceeds to Step S809. If it is determined in Step S803 that the panning speed is not a medium speed, it is determined in Step S805 whether the in-focus flag has been set. If the in-focus flag has been set, a predetermined value $D_P$ is set as the dead bandwidth DB in Step S808, whereas if the in-focus flag has not been set, the processing of Step S809 is performed. The predetermined values $V_N$, $V_P$, $D_N$ and $D_P$ are set to satisfy $V_N > V_P$ and $D_N > D_P$.

Then, in Step S810, the amount of defocusing is calculated, and it is determined in Step S811 whether the amount of defocusing is within the dead bandwidth DB. If the amount of defocusing is within the dead bandwidth DB, the in-focus flag is set in Step S813 and the AF motor 21 is made to stop in Step S817. If the amount of defocusing is not within the dead bandwidth DB, the in-focus flag is cleared in Step S812 and it is determined in Step S814 whether the photographic lens 22 is in near focus. If the photographic lens 22 is in near focus, the process proceeds to Step S816, in which the AF motor 21 is driven to move in the direction of the infinity end, whereas if the photographic lens 22 is not in near focus, the process proceeds to Step S815, in which the AF motor 21 is driven to move in the direction of the closest-distance end. In each of Steps S815 and S816, the speed at which the AF motor 21 is driven is a speed corresponding to the value set in the register $V_M$.

According to the fifth embodiment, if a detected panning speed is a high speed, AF is locked to an in-focus state, whereas if the panning speed is a medium speed, the AF motor is driven at a low speed for a predetermined time after the objective lens has gone out of its in-focus state. If the panning speed is a low speed, the dead bandwidth for determining whether the objective lens is in focus is made wide so that the objective lens can be prevented from easily going out of the in-focus state, whereby it is possible to suppress the occurrence of defocusing during panning.

The manner in which the AF motor is made to stop or is made slow or the dead bandwidth is expanded in accordance with the panning speed is not limited to the manner described above in connection with the fifth embodiment. For example, it is also preferable to adopt an arrangement in which when the panning speed is a medium speed, the dead bandwidth is expanded, whereas when the panning speed is a low speed, the AF motor driving speed is made a low speed.

Regarding the processing to be performed when panning is detected, it is also possible to perform a plurality of processings, for example, the processing of making the dead bandwidth wide and the processing of making the AF motor driving speed a low speed.

As is apparent from the foregoing description, in accordance with the first to fifth embodiments, even if a subject distance varies during panning, an objective lens is held in its in-focus state if the objective lens is in focus at the time of the start of the panning or comes into focus during the panning for the first time. Accordingly, it is possible to prevent occurrence of an image visually impaired by the frequent repetitions of a focus adjusting operation.

Also, since the dead bandwidth for determining whether an objective lens is in focus can be made wide, even if a subject distance varies to some extent, it is determined that the objective lens is in focus. Accordingly, it is possible to suppress the occurrence of frequent repetitions of a focus adjusting operation, whereby it is possible to prevent occurrence of a visually impaired image. In this case, when the panning speed is a high speed, if the dead bandwidth for determining whether the objective lens is in focus is made far wider, it is possible to more securely prevent occurrence of a visually impaired image.

Further, if a focus adjusting speed is made slower than a normal focus adjusting speed when the panning speed is a high speed, even if the distance to a main subject varies abruptly, a focus adjusting operation is slowly performed. Similarly, it is possible to more securely prevent occurrence of a visually impaired image.

By combining such various modes, it is possible to obtain a natural image even during panning.

Also, since a sensor which is provided in image shake correcting means is employed as means for detecting a vibration of a camera or the like, it is possible to incorporate the function of providing a high-quality image even during panning, without the need for an additional mechanical component and without the need to increase the size of an image pickup apparatus such as a camera.

What is claimed is:

1. A camera comprising:
   focus adjusting means for performing focus adjustment of an objective lens;
   panning detecting means;
   controlling means for controlling the focus adjustment of the objective lens on the basis of a detection signal provided by said panning detecting means; and
   discriminating means for discriminating a panning speed on the basis of the detection signal provided by said panning detecting means, said controlling means controlling a speed of the focus adjustment of the objective lens in accordance with the panning speed discriminated by said discriminating means.

2. A camera according to claim 1, wherein said controlling means inhibits the focus adjustment of the objective lens when panning is started with the objective lens in focus.

3. A camera according to claim 1, wherein said controlling means allows, when panning is started with the objective lens out of focus, the focus adjustment of the objective lens to be performed by said focus adjusting means to make the objective lens in focus, and subsequently inhibits the focus adjustment of the objective lens.

4. A camera according to claim 1, wherein said controlling means decreases the speed of the focus adjustment if the panning speed is a high speed and increases the speed of the focus adjustment if the panning speed is a low speed.

5. A camera according to claim 1, wherein said panning detecting means detects panning on the basis of a detection signal indicative of a detected vibration of the camera.

6. A camera comprising:

focus detecting means for detecting a focus state of an objective lens;

panning detecting means for detecting a panning state of a camera; and controlling means for inhibiting a detecting operation by said focus detecting means when panning is detected by said panning detecting means and said objective lens is detected to be in focus by said focus detecting means.

7. A camera according to claim 6, wherein said control means causes said focus detecting means to continue the detecting operation when said objective lens is detected to be out of focus by said focus detecting means.

* * * * *

UNITED STATES PATENT AND TRADEMARK OFFICE
CERTIFICATE OF CORRECTION

PATENT NO. : 5,649,239
DATED : July 15, 1997
INVENTOR(S) : YASUHIRO TAMEKUNI

It is certified that error appears in the above-identified patent and that said Letters Patent is hereby corrected as shown below:

COLUMN 1:

Line 20, "a" should be deleted; and

Line 34, "occurrence" should read --occurrences--.

COLUMN 3:

Line 13, "operate" should read --operates--; and

Line 40, "8408" should read --S408--.

COLUMN 4:

Line 16, "predetermine" should read --predetermined--.

Signed and Sealed this

Tenth Day of February, 1998

Attest:

BRUCE LEHMAN

*Attesting Officer*     *Commissioner of Patents and Trademarks*